Figure 1:
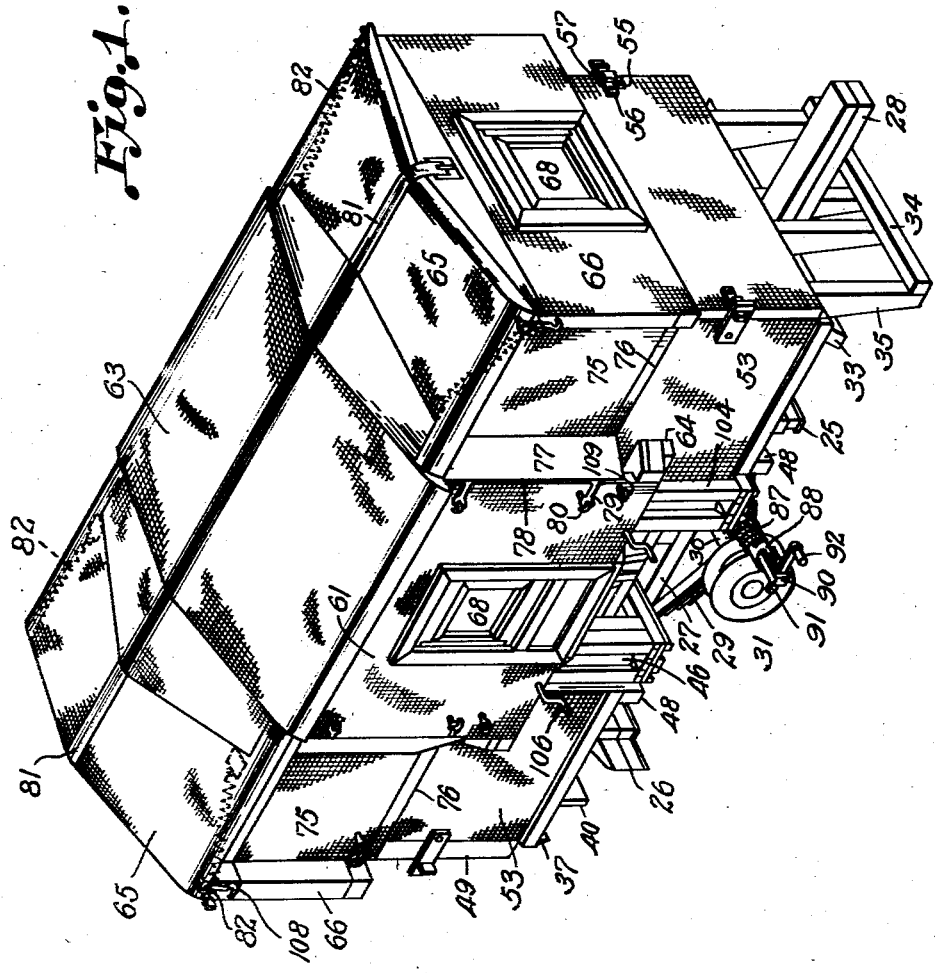

June 4, 1935.                    O. J. LEHRER ET AL                    2,003,598
                                    CAMPING TRAILER
                         Filed May 2, 1934        3 Sheets-Sheet 2

Fig. 2.

Inventor:
Oscar J. Lehrer
John B. Blankenship

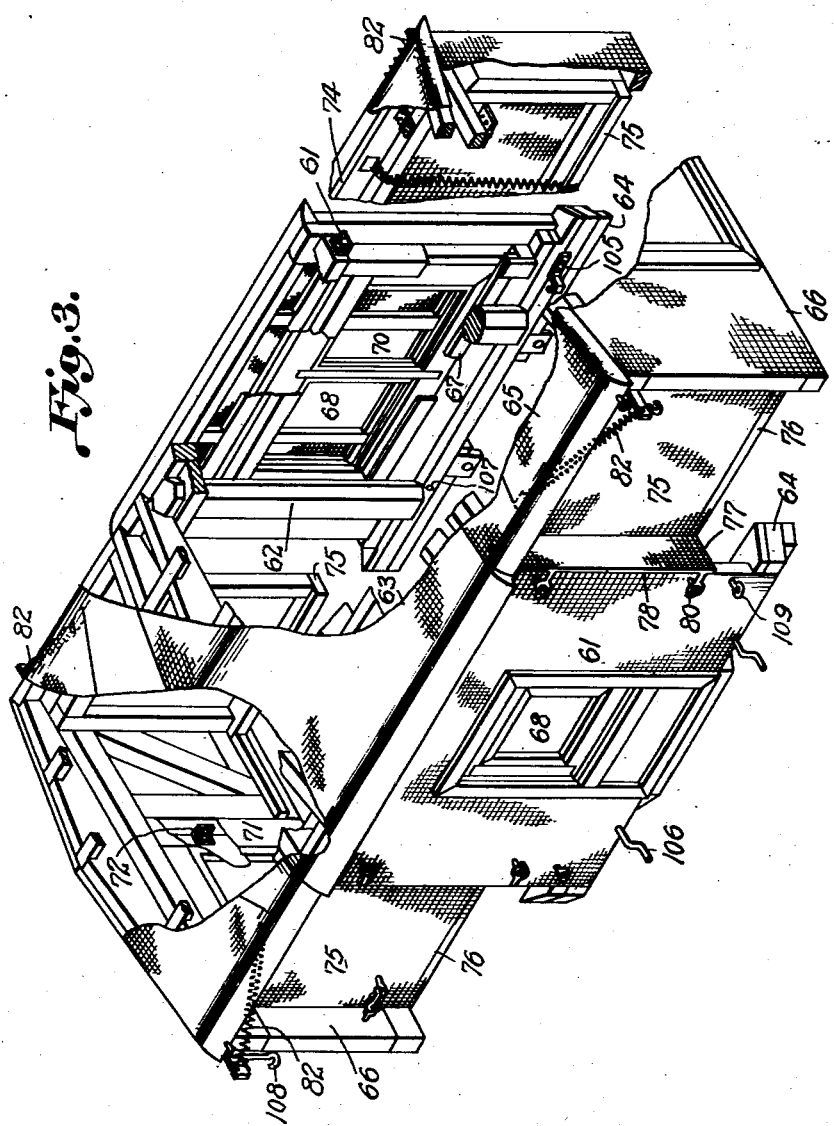

Patented June 4, 1935

2,003,598

UNITED STATES PATENT OFFICE 2,003,598

CAMPING TRAILER

Oscar J. Lehrer and John B. Blankenship, Norman, Okla.

Application May 2, 1934, Serial No. 723,529

7 Claims. (Cl. 296—23)

This invention relates to a trailer for application to a vehicle, and comprehends the provision of a camping outfit, which may be carried as a collapsed unit when the trailer is following a vehicle in transit, and which outfit may be set up into a dwelling when desired, and extended longitudinally and vertically. While collapsed the device will be carried balanced on a trailer chassis, forming a part of the device, and which chassis also may be telescoped to conserve space. The device when collapsed will provide convenient storage space within the compacted structure. An object of the invention is to place a house on a trailer, and provide it with a comfortable and commodious living space, and then, when not in use, to collapse it and carry it as a part of the trailer in compact form; also storing certain parts of the chassis out of the way.

It is one of the important objects of the invention to associate two extensible units, extensible both horizontally and vertically, to provide an elevating roof-unit, and thus form a proper camp dwelling of sufficient length and height to insure comfort and convenience, and yet, at the same time, bring these units into a compact form and arrangement within given limits both as to length and as to height so as to make the compacted unit practical to transmit in traffic.

In the development of this, as well as obvious objects of the invention it is necessary to provide a rather elaborate folding system of parts, in order to yield the compactness needed for a structure of this sort while the device is being trailed.

This system will permit the structure to be extensible along the elongated axis of the trailer and transversely in elevation, and the device is therefore constituted of two independent, and yet interdependent transversely and co-extensible parts, each provided with means for said elongated and elevating extension, and so complementary arranged with respect to each other as to provide a housing unit.

Also the chassis constitutes a part of the invention, being especially designed to accommodate itself to the needs of the structure, and co-operating to induce the extensibility and compactibility, intermittently, at will, of the entire compacted structure, and dwelling.

On the several sheets of drawings, accompanying and forming a part of this specification, Figure 1 is a perspective view of the trailer erected to a usable position and from a folded and trailing position;

Figure 2 is a similar view, with parts broken away to both the interior of the lower section of the trailer, and parts, and Figure 3 is a perspective view of the upper section with parts broken away to show the interior thereof.

In these several views, like characters of reference will indicate like parts.

The device is designed for substantially perfect balance both in transit and when not in use, and in order to make this clear, the chassis will first be set forth.

A main frame is constructed to include a header 25, a bumper 26, and two elongated beams 27. Centrally of the header 25, and passing through it, is a tug or hitch 28, which runs through the frame. Springs 29 support an axle 30 and are bolted to the header and the bumper. Wheels 31 are carried by the axle. Between the forward or hitch end or the tug and the header is pivoted, at 32, a chassis-supporting-crutch, consisting of a pair of bars 33 and 34, and legs 35. When in use the chassis supporting crutch will be perpendicular as in Figure 8. When not in use, when the trailer is travelling, the same is moved upon its pivot, and the bar 33 rests upon the top of the tug 28, while the legs 35 are disposed horizontally in line with the tug 28, and held in that position.

Rearwardly of the bumper 26 is another chassis supporting member which comprises a head 37 carried by two separated elongated bars 38, and which is extensible away from the bumper 26 and slidable thereto by passing through openings in and to the underside of said bumper. To this header is hinged a chassis supporting device, consisting of a bar 39, hinged rearwardly of the header at 37, and from which depend legs 40 supporting the rear end of the trailer when the device is resting.

A fixed floor 44 (see Figure 2) is supported upon the framing of the chassis, and from this floor 44 rises two side walls 45, each of which, on their outer sides, is provided with two vertical guides 46, each having V-shaped runners, as seen in Figure 3. To each end of this fixed floor 44 is hinged an extensible floor-section 47, having an underbeam 48 to rest on the framing of the chassis, and these floors 47 may be moved to set up in a vertical position and placed in alignment with the end edges of the two side walls 45. These floor sections 47 when lowered are designed to be in alignment with the main fixed floor 44 and are supported on the chassis when the parts thereof are extended to a position for use. To each of these floor sections 47 and at their longer outer edges, is hinged an upper section 49 which, when the device is compacted, will fold down on the top side of each floor section 47, and when the latter are standing up in vertical position with relation to the side walls 45, will be placed vertically between the floor sections 47 and the edges of the upstanding side walls 45. In one of these hinged upper sections 49 an opening is provided, which may be occupied by a door 50 suitably hinged to the upper section at 51, and provided with a latch 52.

To the inside of each side wall 45 are hinged side walls 53. When the floor sections 47 are in alignment with the fixed floor 44, and hinged sections 49 are standing vertically, these side walls 53 are swung outwardly on their hinges 54 until their outer ends come against the inner faces of the hinged sections 49, thus forming, at each end, a rectangular extension to elongate the housing space when the device is in use. These end and side sections are held to each other in any suitable manner, as, for instance, as follows: Keepers 55 are secured to the outer sides of the hinged sections 53. In proximity to these are movably mounted tongues 56, and on each side section on the outside thereof is a movably mounted notched latch 57 which, when the sections are in place, may be swung about their pivots to allow them to drop over the tongues 56. This holds the structure, thus set forth, together.

During the collapsing or compacting operation, the latches 57 are swung back away from the tongues 56 and the latter are moved back over their pivots out of the way, and the side sections 53 are folded in pairs against each other across the ends of the side walls 45 and within the confines of them, and this not only allows the side sections to be cared for out of the way, but the arrangement now makes a convenient storage compartment within the device. By reference to Figure 2, it will be noted that an offset 59 is shown in the side wall 45, so that when the springs 29 give sufficiently the wheels 31 will have a clearance up in these offsets, and these offsets on the interior of the house will provide seats 60.

Two side walls 61 are formed complementary to those 45, and are designed to telescope the same during elevation and lowering of these upper side walls 61. These walls 61 are provided with V-shaped guides 62, formed on their inner sides to travel in the like grooves 46 (see Figure 2) on the side walls 45. These side walls 61 carry and support a roof 63 and at the bottom of these side walls are bolsters 64 which not only forms the base of these walls, but when the side walls are lowered into compact place or position they drop into the space formed between the header 25 and the bumper 26 on the chassis of the trailer, for the purpose of shielding the foldable parts from impact by another vehicle when it bumps into the trailer. From the main roof 63 extends two hinged roof sections 65 which are hinged to the main roof 63 and to the outer ends of each of these roof sections 65 are hinged drop-wall sections 66, which are complementary to and associatable with the hinged sections 49, and in any suitable manner, means, in the form of latches, may be provided to make the two sets of sections vertically stable when the device is set up. In one of these wall sections 66 a window opening is provided, and slides 67 are provided (see Figure 6) to receive a window unit 68 which comprises a window 681 and a screen 70 and this element may be shifted to the right or to the left, as desired, or the same may be placed, as shown in Figure 5, to give both light and ventilation at the same time. The opposite section is provided with a door 71, hinged at 72, and provided with the usual latch 73.

From beams 74 dropping from the roof sections 65 are hinged side sections 75 which are provided with drop fabric flaps 76 to overhang the upper edges of the side sections 49 to protect the dwelling from wind and rain. These side walls 66 are also provided with lateral flaps 77 through which passes a wire 78 provided with eyes 79 to overtake hooks 80 on the outside of the main upright walls of the upper unit. The side walls 61 of this upper extensible unit are provided with openings covered by a combined screen and window, as previously set forth, and arranged in the same manner.

The structure is covered with fabric, and the fabric from the main roof 63 extends out over the roof extensions 65, and these fabric extensions are provided with straps 81 which are buckled into place to hold the overhanging flaps against being lifted by the wind. These overhanging flaps are also under the control of springs 82 which give when the roof sections 65 are dropped down in closing to the position shown in Figure 1 when part of the roof fabric must be taken up when the sections move from a horizontal to a vertical position. To hold the upper section 75 in place to the end sections 66, latches 83 are provided which are pivoted to said sections and have their beaks enter sockets (not shown) in the inner faces of the end sections 66 when they are held in place.

Referring now to the means and method for raising and lowering the upper extensible unit as set forth, at the upper ends of the lower side walls 45 and in a header are two pulleys 86. Over these pulleys run cables 87 and one end of the cables which runs over both pulleys is attached to the bolster 64 at one side thereof, and the cable running over the one pulley is also attached to the same bolster 64 at the other side thereof, and both of these cables 87 are attached to and storable upon a shaft 88 carried to the underside of the chassis and in bearings 89. On the head of this shaft is a keeper 90 into which is slipped the tongue 91 of a crank 92. When this crank is turned to the right the cables will pile up on the shaft 88 and raise the upper extensible unit.

Through the shaft 88, is a diametric opening. Laterally of this shaft is a bracket 93 having depending arms with openings and through these openings passes a pin 94 which is designed, when the cables are wound upon the shafts 88, to pass into the opening in the shaft 88 to hold it against movement.

To further insure the proper propping of the upper extensible unit, there is provided in the outer side walls 45, between the guides, a central rib 99 over which is straddled a bracket 100 pivoted at 101, and having an inner bevelled face 102, shown by dotted lines, or seen in Fig. 14, and as this bracket is pulled away from the face of the walls 45 so that the bevelled faces will bear against the face of the walls, the head 103 of the bracket will take to the underside of the bolsters 64 and positively hold the upper extensible unit in position. While the guides co-operate to insure the proper raising and lowering of the upper extensible section by the winding operation, there is still provided additional means of guiding and holding the upper and lower units by the use of steel guides 104 on the outer edges of the lower side walls 45, with which co-operate hooks 105 on the inside of the upper side walls. When the upper extensible unit is in its lowermost position, so that the bolsters 64 are down to the chassis, retainers 106 are screwed in until their free ends are allowed to enter openings 107 which prevent the upper extensible section from bouncing up and down when the upper extensible unit is compacted.

The use of the device will now be explained descriptively. Assuming the device to be knocked down, collapsed or folded as in Figure 1, the upper extensible unit will have its bolsters resting down in place on the chassis, and the elements 106 will be in the openings 107. The roof sections 65 will be perpendicularly arranged by being dropped from the main roof 63 and will confine the ends 56 between the roof sections 65 and the ends of the side walls 64. During this time, the side upper sections 75 will be packed away to the underside of the extensible roof sections. Within the confines of this compacted arrangement will be the side walls 45, the sections 53, and 48 and 49, carried by and forming a part of the lower chassis unit. The roof sections 65 will be held in place by the hooks 108 taking into the eyes 109. It is now desired to convert the compact from the position of Figure 1 to that of Figure 2.

The tongue 91 of the crank 92 is placed in the keeper 90 on the shaft 88. The pin 94 is withdrawn entirely from the shaft 88 and from the opening 98 in one of the arm brackets, and allowed to so remain. The crank 92 is now operated to wind up the cables 87 when the upper extensible unit will raise to the position shown in Figure 2, the elements 106 first having been released from the retaining opening 107. The props 100 are now moved outwardly away from the face of the walls 45 of the lower unit, and placed to the underside of the bolsters 64. The upper side sections 75 which have been folded up in under the roof sections 65 by the action of the springs 108 which are attached to these sections and the beam 74. The lower floor sections 47 are dropped down on to the chassis and the end sections are set up in place, with the side sections 53 brought out to the side edges of the end floors 47 and then these parts are locked in place. The roof sections 65 are now lifted in alignment with the main roof 63 and the end sections dropped into place until they register and co-operate with the end walls 49, when they, as previously stated, may be stabilized together in any bolting manner not needed to be set forth here. This not only closes the ends, but forms a support from the roof down to the floor of the structure. The straps 81 are now buckled into place to draw the overlapping roof fabric tightly from the main roof to the roof sections. The side sections 75 which have been held up under the roof sections 65 by the springs 108 are now lowered and the fabric flaps 76 and 77 are made to overhang the walls 61 and the side lower walls 53, and the latter flaps are held in place by being hooked by the eyes 79 to the hooks 80. These side sections 75 are then latched to the upper end-drop section 66 by latches 83. This forms a complete enclosure and an elongated house with sufficient upper extensible roof and living space to provide a complete and comfortable camp dwelling. Preparatory to this operation, it will be noticed that it is necessary to lower the props at each end of the chassis, and the one at the bumper end will first be withdrawn away from the bumper to form a rest under the extension floor. When it is desired to compact the device again the operation will be as follows: The upper side sections 75 will be released, and allowed by the springs 108 to take up under the roof sections 65, the upper end walls 60 are folded against them, as seen in Figure 4, and the roof sections 66 are hooked in place as seen in Figures 1 and 4. Then the latches are released at the inter-sections of the end walls 49 and side sections 53 and the latter are folded in as in Figure 3 and the end sections are dropped on to the extension floor sections 47 which are turned up against the ends of the side walls 45 putting the entire compact arrangement out of the path of the lowerable upper extensible unit. This latter upper extensible unit is now allowed to lower in place as shown in Figure 1. When this is accomplished, the props 40 are released from their upstanding position, and the legs thereof are shoved under the chassis, and in the openings provided for them, and the forward prop is turned up in the plane of the tug 28 and held in place by the button 36.

Obviously, while the specification has been directed to the structure as set forth in the drawings, mechanical changes may be made and arranged for according to the needs of structure and manufacture.

It will now be seen that there is provided a practical, efficient and serviceable compactible unit in the formation of a trailer which may be converted into a dwelling of sufficient capacity to provide comfort and convenience when out away from home.

Having thus set forth this invention, we claim:

1. In a device of the character set forth, the combination with a chassis having a tug, of convertible props therefor, a lower unit fixed centrally upon the chassis, an upper extensible unit adapted to telescope the lower unit when lowered over said lower unit, guides formed on the inside and outside of said upper and lower units, means to raise the unit uppermost to a dwelling forming position, means to hold the same in that position, extensible floor sections on the lower unit to elongate the structure, side sections hinged to the lower unit, and adapted to be swung to dwelling forming positions, end walls carried by the extensible floor sections, and co-operating with the side walls, extension roofs carried by the upper extension unit extensible directionally with the floor extensions, side walls depending therefrom and meeting the aforesaid lower side walls, end walls carried by the roof sections and adapted to register with the lower end walls, means to latch the side walls and end walls together, and the end walls of the upper and lower sections and the side walls thereof being adapted to be folded together, while the upper section telescopes the lower section, and means to hold the telescoped sections together.

2. In a device as set forth, the combination with a chassis, a prop therefor adapted to be folded against the chassis, a second prop also foldable against the chassis and extensible with relation thereto, a fixed floor on the chassis, movable floor to elongate the fixed floor extensions carried by said fixed floor, side walls rising from the fixed floor, side sections hinged to said side walls, end walls carried by the floor extensions, and adapted to register with the hinged side sections, means to latch the sections and the end walls into co-operation, guides carried by the side walls, an upper extensible unit consisting of side walls complemental to and telescopically movable vertically with relation to the first named side walls, guides carried thereby and moving with the guides first named, extensible roof sections for covering the elongated floor sections carried by the upper extensible unit, drop walls carried by the extensible roof sections and registering at will with the lower end walls, side sections dropping from the roof extensions and adapted to co-operate with the lower side walls and the upper drop wall, means to latch the upper drop walls and the upper side walls into operative position, the upper and the lower end walls having openings, means to raise and lower the upper extensible sections with relation to the lower ones, means to control said means, and means to positively prop the upper section in elevation upon the lower section.

3. In a device of the kind set forth, the combination with a convertible chassis having a tug, of convertible and storable props therefor, means to elongate and contract the chassis, a fixed floor upon the chassis, walls rising therefrom, guides carried by the rising walls, pulleys carried thereby, hinged extensible floors carried by the fixed floor, end walls carried by and movable with relation to the extension floors, hinged side walls carried by the rising walls, and adapted to swing out and to the end walls, means to latch them together, an upper extensible unit consisting of two walls complimentary to the first named side walls, guides carried thereby and co-operating with the first named guides, a roof carried by the upper side walls, bolsters formed on the lower ends of the upper side walls, cables secured thereto and passing over said pulleys, a shaft to receive the cables, means to operate the shaft and wind the cables to lift and lower the second set of walls, extensions carried by the roof section, drop ends carried by said sections, side walls carried by said roof extensions and adapted to drop and co-operate with the lower side walls and the upper end walls, springs to force the upper side walls up in under the roof sections, means to hold the upper roof sections to the upper side walls when the roof sections and side sections are folded together, said upper section being adapted to be lowered over and to include the infolded sides, end and floor sections of the lower unit, and means to hold the upper unit in place to the lower unit.

4. A compacted and extensible trailer, including a chassis, an extensible prop carried thereby, a second prop movably mounted thereon and adapted to be folded to the chassis, a fixed floor upon the chassis, a pair of side walls rising from the fixed floor, a pair of guides secured to said side walls on their exterior, a header for each side wall, pulleys carried by each header, cables running over said pulleys, means to control the cables, means to control the cable controlling means, side walls hinged to said rising side walls and adapted to be folded in between them, extension floors carried by the main fixed floor, end walls carried by the extension floors means to fasten the end walls and side walls together, a second upper extending unit comprising two side walls complementary to and slidable upon the first named side walls, guides to co-operate with the first named guides for raising and lowering the second named side walls, a roof carried by the second set of side walls, extension roof sections carried by the roof, sides carried to the underside of the roof sections, drop walls at the end of the roof sections co-operating both with the side sections and the end walls of the extension floor sections, means to secure the upper side walls and the upper end walls in place, overlapping flaps carried by the upper side sections to overhang the lower side walls and the upper central side walls, bolsters carried by the upper central side walls, said bolsters carrying the ends of said cables, means to wind the cables to raise and lower the upper unit, means to hold the winding means, and means to support the upper extensible unit in upper extended position.

5. In a device of the kind set forth, the combination with a chassis, of a fixed platform thereon, upstanding side walls rising from the fixed platform, hinged wall sections secured to said side walls and adapted to close into the side walls in opposed directions to form a baggage space, hinged extension floors supportable by the chassis and adapted to be raised to a vertical position alongside of the hinged side walls, an end wall hinged to said floor extensions and foldable against the top side of said floor extension and between the floor extension and the hinged side walls, to form a lower compact, guides carried by the upstanding side walls, a header carried between the guides, a roof adapted to be raised and lowered with relation to the upstanding side walls, a second set of side walls adapted to telescope the first named side walls, guides also carried thereby for meshing with the first named guides, extension roofs carried by said first named roof, drop walls hanging from said extension roofs and adapted to be folded to the underside of the extension roofs, side walls dropping from the extension roofs, and co-operating with the first named hinged side walls, flaps on said side walls and overhanging the lower side walls and the upper main side walls, said upper drop walls adapted to be folded to the upper side walls and placed against the ends of the upper side walls and there secured, and means to raise and lower the upper side walls and roofing while folded over the folded units of the lower side walls, floor extensions, end walls, and side walls.

6. In a device of the kind set forth, the combination with a chassis, of a fixed horizontal platform thereon, upstanding side walls rising from the horizontal fixed platform, hinged wall-sections movably mounted in connection with said side walls and adapted to be closed into the side walls, and in opposed directions, to form a baggage compartment, hinged extension floors extending in opposed horizontal directions from the fixed horizontal floor and supportable by the chassis, and adapted to be raised to a vertical position parallel with the hinged side walls, an end wall hinged to each extension floor and adapted to be folded against the top side of said floor extension, and between the floor extension and the hinged side walls, to form a lower compact, guides carried by the upstanding sidewalls, a header carried between the guides, a roof adapted to be raised and lowered with relation to the upstanding side walls, a second set of side walls adapted to telescope the first named side walls and extension floors, guides also carried thereby for meshing with the first named guides, extension roofs carried by said first named roof, drop walls hanging from said extension roofs and adapted to be folded to the underside of the extension roofs, side walls dropping from the extension roof and co-operating with the first named hinged side walls, flaps on said side walls and overhanging the lower side walls and the upper main side walls, said upper drop walls adapted to be folded to the upper side walls and placed against the ends of the upper side walls and there secured, means to secure the various walls to each other, when the dwelling is erected, and means to raise and lower the upper side walls and roof while folded over the folded units of the lower side walls, floor extensions, end walls and side walls.

7. In a device of the character set forth, the combination with a chassis having a tug, of convertible props therefor, a lower unit mounted upon the chassis, and consisting of a fixed floor, extensible floors connected with the fixed floor, an end wall connected to the outer ends of each extensible floor, upright stationary walls associated with the fixed floor, guides on said walls, secondary guides on said walls, extensible side walls movable with relation to and foldable inwardly from said fixed walls, an upper unit telescopically mounted upon the lower unit and raisable and lowerable with relation to the lower unit, guides thereon to co-operate with the first named guides, a fixed roof unit thereon, extensible and movable roof units extending therefrom to cover the lower floor extensions when extended, end walls dropping from said extensible roof units, side walls also dropping therefrom, means to lock the upper and lower unit parts together at will, means to raise and lower the upper unit, means to hold said means to hold the upper unit, additional means to support the upper unit in its uppermost operative position, and overlapping flaps between the various walls to prevent introduction of wind, rain and dust.

OSCAR J. LEHRER.
JOHN B. BLANKENSHIP.